US010633119B1

(12) United States Patent
Smirnov

(10) Patent No.: US 10,633,119 B1
(45) Date of Patent: Apr. 28, 2020

(54) METHODS OF TESTING A MONUMENT THAT IS TO BE ATTACHED TO A FLOOR OF AN AIRCRAFT

(71) Applicant: The Boeing Company, Chicago, IL (US)

(72) Inventor: Alexey N. Smirnov, Bothell, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/210,154

(22) Filed: Dec. 5, 2018

(51) Int. Cl.
*G01M 5/00* (2006.01)
*B64F 5/60* (2017.01)
*G01N 3/10* (2006.01)
*G06F 17/16* (2006.01)

(52) U.S. Cl.
CPC ............ *B64F 5/60* (2017.01); *G01M 5/0041* (2013.01); *G01N 3/10* (2013.01); *G06F 17/16* (2013.01); *G01N 2203/0003* (2013.01); *G01N 2203/0019* (2013.01); *G01N 2203/0048* (2013.01); *G01N 2203/0075* (2013.01); *G01N 2203/0216* (2013.01); *G01N 2203/0676* (2013.01)

(58) Field of Classification Search
CPC .......... B64F 5/60; G01M 5/0041; G01N 3/10; G01N 2203/0003; G01N 2203/0019; G01N 2203/0048; G01N 2203/0075; G01N 2203/0676; G06F 17/16
USPC .......................................................... 73/788
See application file for complete search history.

(56) References Cited

U.S. PATENT DOCUMENTS

| 5,390,543 A * | 2/1995 | Staple ..................... G01M 7/00 244/17.11 |
| 6,196,514 B1 * | 3/2001 | Kienholz ............ F16F 15/0275 244/164 |
| 2006/0004499 A1 * | 1/2006 | Trego ..................... B64D 45/00 701/31.4 |
| 2006/0043239 A1 * | 3/2006 | Floyd ....................... B64F 5/60 244/131 |
| 2007/0018054 A1 * | 1/2007 | Enzinger ................. B64C 13/16 244/195 |
| 2011/0146406 A1 * | 6/2011 | Napolitano ........... G01M 7/022 73/583 |
| 2012/0298794 A1 * | 11/2012 | Krysinski ............. B64C 27/001 244/17.27 |
| 2017/0283086 A1 * | 10/2017 | Garing ............... B64D 11/0638 |
| 2018/0216988 A1 * | 8/2018 | Nance .................... G01G 19/07 |
| 2019/0308744 A1 * | 10/2019 | Riedel .................... B64D 45/00 |

* cited by examiner

*Primary Examiner* — Max H Noori
(74) *Attorney, Agent, or Firm* — Coats & Bennett, PLLC

(57) ABSTRACT

Methods of testing a monument that is attached to a floor of the aircraft. The testing uses a compliance matrix based on attachment points where the monument is attached to the floor of the aircraft. The testing uses a test monument that is equipped with extension members and load cells positioned at the corresponding attachment points. A test load is applied to the test monument and reaction loads are determined at each attachment point. During the test period, the compliance matrix and reaction loads are used to calculate displacements at each attachment point. Each of the extension members are then adjusted by the corresponding displacement. At the end of the test period, determination is made as to whether the test monument is capable of sustaining the predetermined load and adjusted displacements at the attachment points.

20 Claims, 10 Drawing Sheets

METHODS OF TESTING A MONUMENT THAT IS TO BE ATTACHED TO A FLOOR OF AN AIRCRAFT

TECHNOLOGICAL FIELD

The present disclosure relates generally to testing methods and, more particularly, to testing methods that determine the structural capability of a monument that is to be attached in an aircraft.

BACKGROUND

The interior of an aircraft can be customized in many different layouts. This includes the positioning of various monuments, such as but not limited to lavatories, galleys, dividers, and closets. The monuments should be constructed and attached within the aircraft to withstand predetermined loads, such as flight, decompression, or ground crash loads. Various testing methods are currently employed to test the monuments.

Some testing methods attach a test monument to a relatively rigid structure that represents the aircraft floor. However, the test does not account for floor stiffness. Another testing method is for isolated springs to be attached to the test monument. This method accounts for the floor flexibility. However, the test method does not account for the co-dependency of deflections at the different attachment points where the test monument is attached to the floor.

Another testing method constructs a replica of the floor. The floor replica accounts for the co-dependency of deflections between the different attachment points. However, constructing a floor replica is expensive and time consuming. Further, the floor usually cannot be re-used in subsequent testing thus adding to the cost and time for constructing additional replicas. Further, this method is not practical when multiple different monument arrangements and floors need to be tested. One example of when occurs is for a monument supplier that supplies monuments to different aircraft manufacturers or for different zones in an aircraft.

SUMMARY

One aspect is directed to a method of testing a monument that is to be attached to a floor of an aircraft. The method includes receiving a compliance matrix of the floor of the aircraft and attachment points where a monument is to be attached to the floor of the aircraft. The method includes placing an extension member and a load cell on a test monument at attachment locations corresponding to the attachment points. The method includes during a test period, gradually applying a test load to the test monument. The method includes at a designated testing frequency during the test period and prior to reaching a predetermined test load: measuring with the load cells a reaction load at each of the attachment locations on the test monument; calculating a displacement of the floor at each of the attachment locations using the compliance matrix; and adjusting each of the extension members by the corresponding displacement.

In another aspect, the method also includes determining whether the reaction loads at the attachment locations exceed a predetermined amount during the test period.

In another aspect, placing the extension members and the load cells on the test monument at the attachment locations corresponding to the attachment points comprises placing hydraulic cylinders and the load cells on the test monument at the attachment locations corresponding to the attachment points.

In another aspect, placing the extension members and the load cells on the test monument at the locations corresponding to the attachment points comprises attaching one of the extension members and one of the load cells on the test monument at each of the attachment locations.

In another aspect, the number of extension members and load cells is equal to the number of the attachment points.

In another aspect, calculating the displacement of the floor at each of the attachment locations using the compliance matrix comprises determining the displacement of the floor based on an interdependency between the deflections at each of the attachment locations.

In another aspect, the method also includes at the designated testing frequency during the test period and prior to reaching the predetermined test load, adjusting each of the extension members by an additional amount based on a global floor displacement.

In another aspect, the monument is either a galley or a lavatory that are each configured to be attached to the floor of the aircraft.

One aspect is directed to a method of testing a monument that is to be attached to a structure that is larger than the monument. The method includes receiving a compliance matrix of a structure and attachment points where a monument is to be attached to the structure, with the structure being larger than the monument. The method includes placing a hydraulic cylinder and a load cell on a test monument at attachment locations corresponding to the attachment points. The method includes applying a test load to the test monument during a test period. The method includes that at a designated testing frequency during a test period: increasing the test load that is applied to the test monument; measuring with the load cells a reaction load at each of the attachment locations on the test monument; calculating a displacement of the structure at each of the attachment locations using the compliance matrix; and adjusting each of the hydraulic cylinders by the corresponding displacement.

In another aspect, the method also includes determining whether the reaction loads at the attachment locations exceed a predetermined amount during the test period.

In another aspect, the number of hydraulic cylinders and load cells is equal to the number of the attachment points.

In another aspect, the method also includes the compliance matrix having rows and columns, with each of the rows and columns being equal to a number of the attachment points.

In another aspect, the test monument is one of a galley or a lavatory and the structure is a floor of an aircraft.

In another aspect, calculating the displacement of the floor at each of the locations using the compliance matrix comprises calculating the displacement based on an interdependency between the displacements at each of the attachment locations.

In another aspect, the method also includes at the designated testing frequency during the testing period and prior to reaching a predetermined test load, adjusting each of the extension members by an additional amount based on a global floor displacement.

One aspect is directed to a computing device configured to calculate reaction loads exerted on a test monument during testing. The computing device includes a communications interface circuitry configured to receive a compliance matrix of a floor of an aircraft and attachment points where a test monument is to be attached to the floor of the aircraft. Processing circuitry is configured to: receive signals indicating a reaction load at attachment locations on the test monument that correspond to the attachment points; calculate a displacement of the floor at each of the attachment locations using the compliance matrix and measured reaction loads at each of the locations; and adjust extension members at each of the attachment points by the corresponding displacement.

In another aspect, the processing circuitry is further configured to determine whether the reaction loads at the locations exceed a predetermined amount.

In another aspect, the signals are received from load cells that are attached to the test monument at attachment locations on the test monument.

In another aspect, the signals are received while a test load is applied to the test monument.

In another aspect, the processing circuitry is further configured to adjust each of the extension members by a global floor displacement.

The features, functions and advantages that have been discussed can be achieved independently in various aspects or may be combined in yet other aspects further details of which can be seen with reference to the following description and the drawings.

DETAILED DESCRIPTION

The present application is directed to methods of testing a monument that is attached to a floor of the aircraft. The testing uses a compliance matrix that utilizes stiffness relationships between different points on the floor. These points correspond to attachment points where the monument is attached to the floor of the aircraft. The testing occurs on a test monument that replicates the monument. The test monument is equipped with extension members and load cells at points that correspond to the attachment points. A test load is applied to the test monument and reaction loads are determined at each load cell. The compliance matrix and reaction loads are used to calculate a vertical displacement at each of the attachment points. Each of the extension members are then vertically adjusted by the corresponding displacement. This process continues during the test period with the extension members being vertically adjusted and the test load being applied to the test monument. At the end of the test period, a determination is made as to whether the test monument is capable of sustaining the predetermined load and adjusted displacements at the attachment points.

Figure 1:
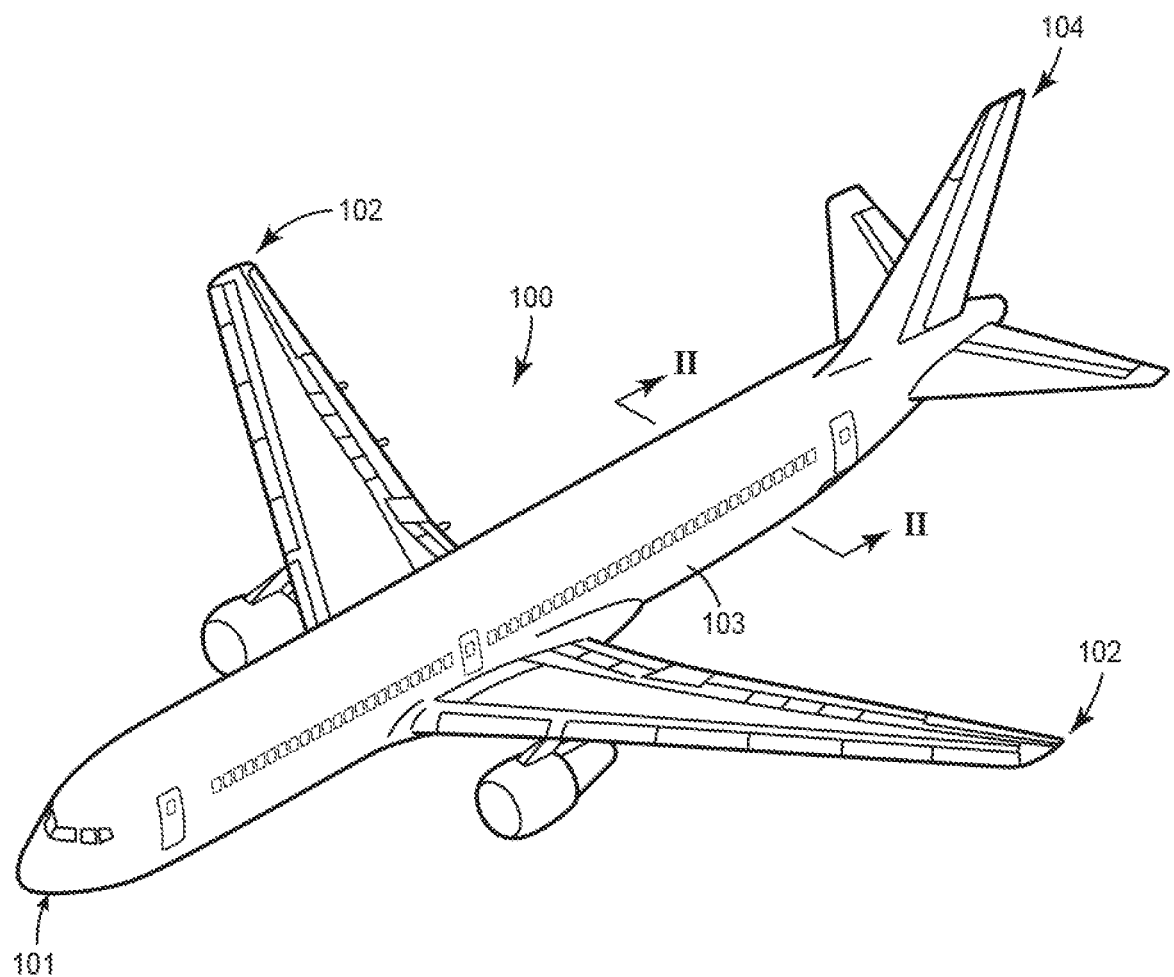
FIG. 1 is a perspective view of an aircraft.
Figure 2:
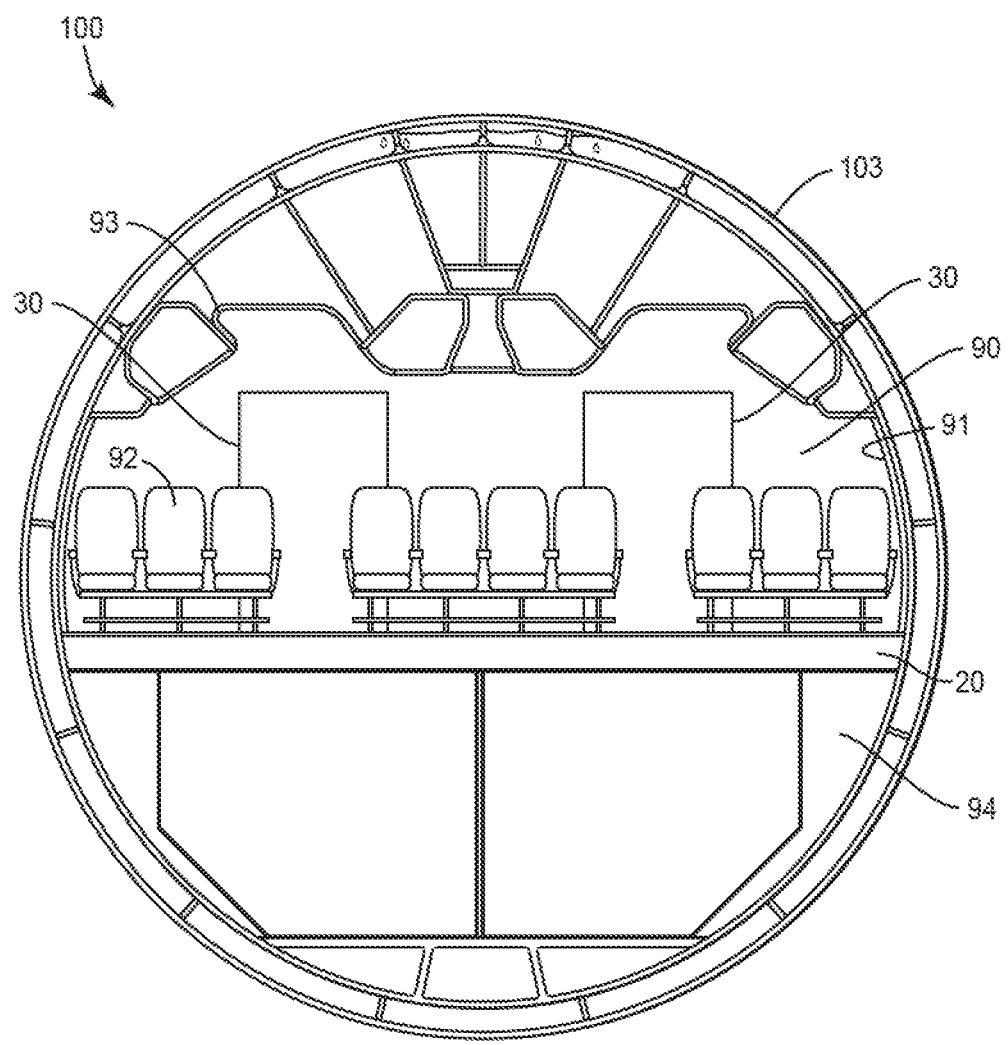
FIG. 2 is a sectional view cut along line II-II of FIG. 1.

FIG. 1 illustrates an aircraft 100 which is one of the types of vehicles applicable to the testing methods. The aircraft 100 includes a nose 101, wings 102, a fuselage 103, and a tail 104. FIG. 2 is a cross-sectional, schematic view of the aircraft 100 indicated by view arrows II-II in FIG. 1. A floor 20 is positioned within the interior space 90 and extends between interior walls 91. A ceiling 93 extends across an upper section of the interior space 90. The ceiling 93 can include compartments to store luggage and other personal items of passengers. A cargo hold 94 is positioned below the floor 20 in a lower portion of the aircraft 100.

Seats 92 are mounted to the floor 20 and are configured in rows to accommodate the passengers. One or more monuments 30 are mounted in the interior space 90 to one or more of the floor 20, ceiling 93, and interior walls 91 and can be positioned at various locations within the interior space 90. Monuments 30 can include various structures, including but not limited to galleys, closets, dividers, and lavatories.

Figure 3:
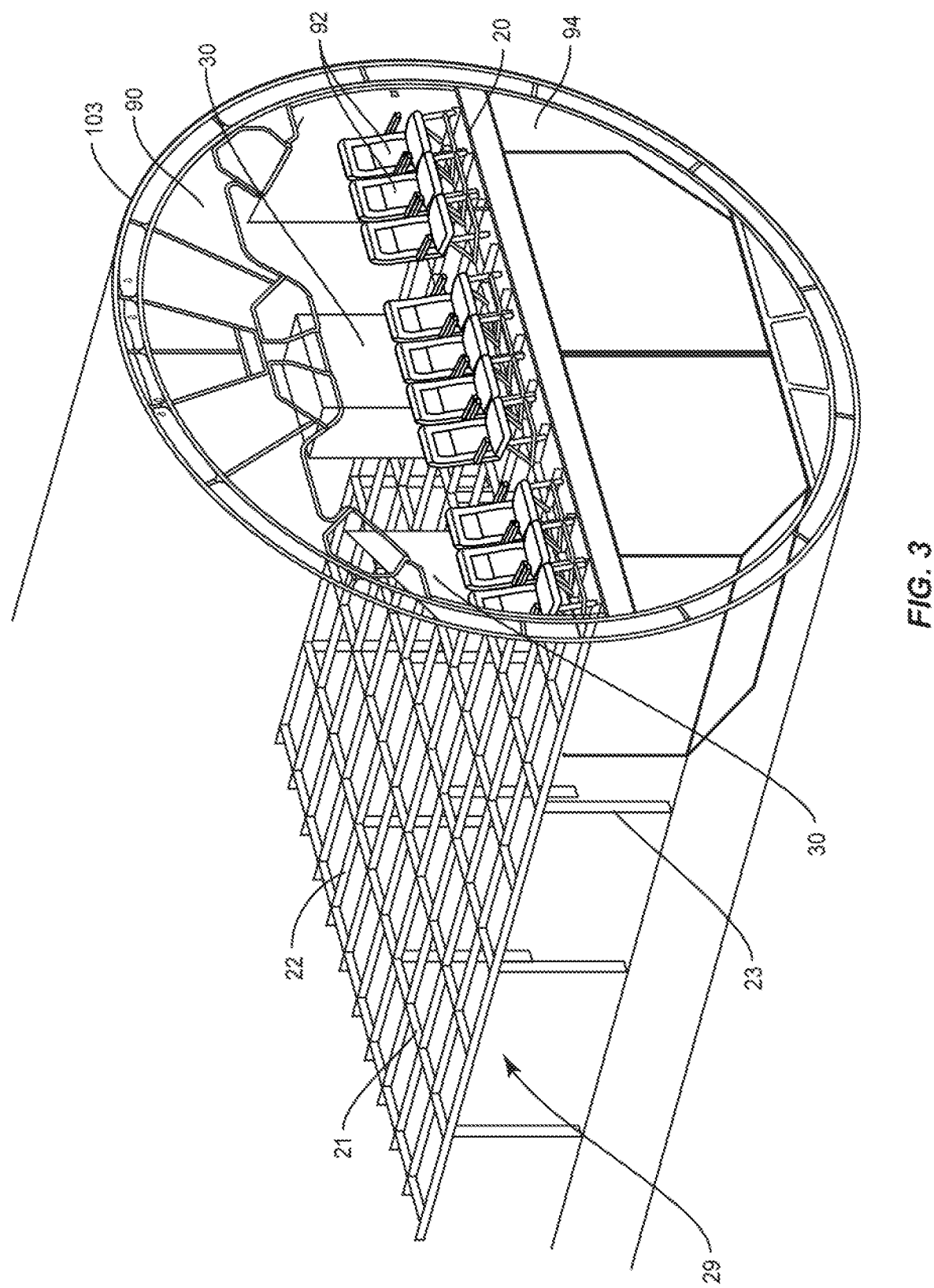
FIG. 3 is a schematic view of a floor model within an interior of an aircraft.

The floor 20 is designed to support the seats 92, monuments 30, and persons within the interior space 90. As illustrated in FIG. 3, the floor 20 includes a variety of structural members 29 including floor beams 21, joists 22, and stanchions 23. Additional structural members 29, such as but not limited to floor panels, seat tracks, and intercostals can also be included in the floor 20. The structural members 29 provide the necessary strength to the floor 20.

Computer systems are used during the design of the floor 20 of the aircraft 100. One process includes the use of computer systems during the creation and modification of the floor 20. For example, a computer system can be used to create, run, process, etc. a finite element model in order to perform a structural analysis on the floor. The computer systems further facilitate the analysis and optimization of the various structural members 29 used in the floor 20.

Figure 4:
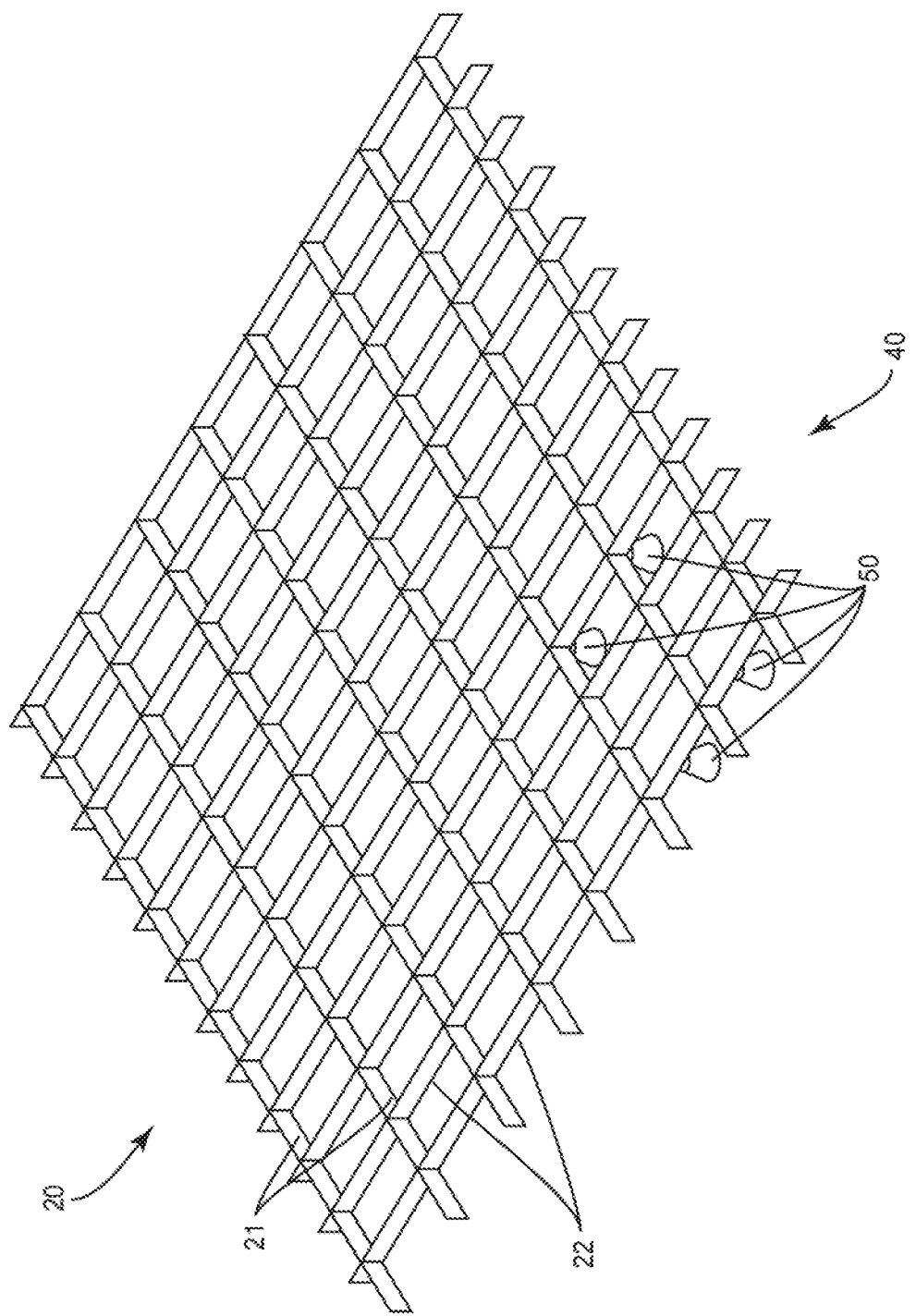
FIG. 4 is a computer floor model.

FIG. 4 illustrates a drawing of the computer model 40 of the floor 20 that is designed using the computer systems. The computer model 40 replicates the structural members 29 and is used to determine the given strength of the floor 20. The computer system facilitates the design of the floor 20, including the numbers, types, properties, and layout of the structural members 29. The computer model 40 also facilitates changes to the structural members 29 and the resultant strength changes to the floor 20. The floor 20 can also be designed through more traditional methods using long-hand engineering analysis and technical drafting.

In the various methodologies, attachment points 50 for each of the monuments 30 are located on the floor 20. The attachment points 50 are the locations of mechanical connections between the monument 30 and the floor 20 that secure the monument 30 in position on the floor 20. The number and positioning of the attachment points 50 can vary depending upon various aspects, including but not limited to size of the monument 30, configuration of the aircraft 100, and location of the monument 30 within the interior space 90. FIG. 4 includes a design with four attachment points 50 for a monument 30. The number and positioning of the attachment points 50 for each monument 30 can vary.

A compliance matrix for a vertical stiffness of the floor 20 is constructed using the floor design and the attachment points 50. The compliance matrix is constructed by applying a single vertical load to a first attachment point 50 and noting the displacement at each of attachment points 50. The process continues by applying a single vertical load at each attachment point 50 and measuring the displacement at each attachment point 50. The vertical loads applied at each attachment point 50 can be the same or different.

Figure 5:
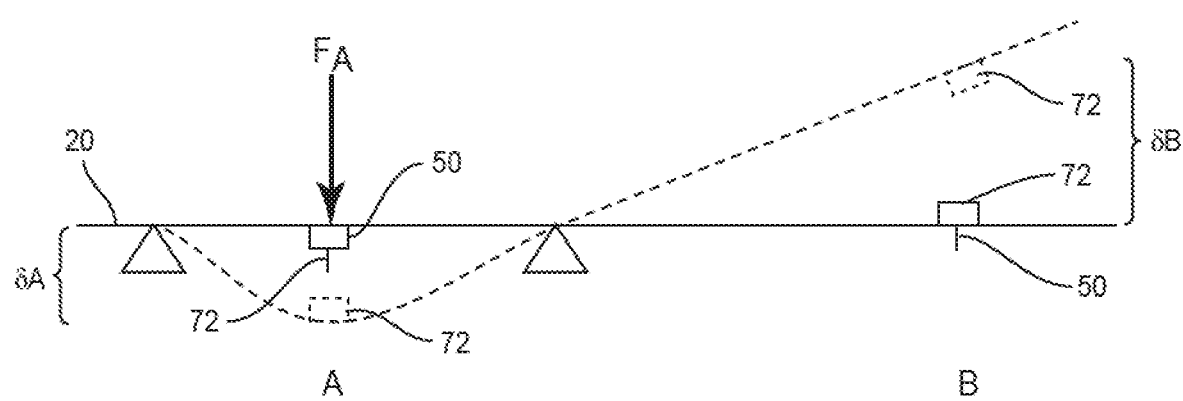
FIG. 5 is a schematic diagram of deflection of a floor based on a force applied to a single point.

FIG. 5 illustrates an example of how to form a first row of a compliance matrix in a greatly simplified theoretical example with just two attachment points. This example is given for the sake of simplicity in demonstration of the principal of compliance matrix creation procedure. The floor 20 includes attachment points 50 represented at points A and B. To form the first row of the compliance matrix, a known load $F_A$ is applied to the floor 20 at the first attachment point 50. The load $F_A$ results in a vertical displacement of the floor 20 (illustrated in dashed lines) of δA at point A and −δB at point B. The compliance matrix includes the ratios of the displacements over the applied load. For example using FIG. 5, the first row of the compliance matrix would include C11=δA/$F_A$ and C12=−δB/$F_A$.

The second row of the compliance matrix is formed in a similar manner. Initially, the load $F_A$ is removed from the floor 20. A known load is then applied to the floor 20 at the second attachment point B. The displacements are collected at each attachment point 50 starting at the first attachment point 50. The ratio of the displacement over the applied load at each of the attachment points 50 forms the second row.

The compliance matrix provides a matrix corresponding to each of the attachment points 50. The number of attachment points 50 defines the size of the compliance matrix. A monument 30 with five attachment points 50 would have a 5×5 compliance matrix (i.e., five rows by five columns). A monument 30 with six attachment points 50 would have a 6×6 compliance matrix. Equation 1 is a compliance matrix of a monument 30 with four attachment points 50 such as the design illustrated in the example of FIG. 4.

$$\begin{bmatrix} C11 & \cdots & C14 \\ \vdots & \ddots & \vdots \\ C41 & \cdots & C44 \end{bmatrix} \quad \text{Eq. 1}$$

Stiffness of an attachment point 50 can be described in generic terms by three (3) deflections in X(forward-aft), Y(left-right), and Z(up-down) directions correspondingly, and three (3) rotations around the X, Y, and Z axes. The practical design of the floor 20 and attachment points 50 can simplify the stiffness description. Specifically, the design of the attachment fittings can eliminate rotation dependencies between the floor 20 and the monument 30. The presence of floor panels (i.e., structures on which passengers walk) makes floor stiffness in the X and Y directions dramatically higher than in the Z vertical direction. As a result of these aspects, just one (1) of six (6) stiffness values is considered during the testing, namely stiffness and displacements in the vertical direction. The compliance matrix is thus a mathematical description of the airplane floor stiffness in the Z vertical direction.

Figure 6:
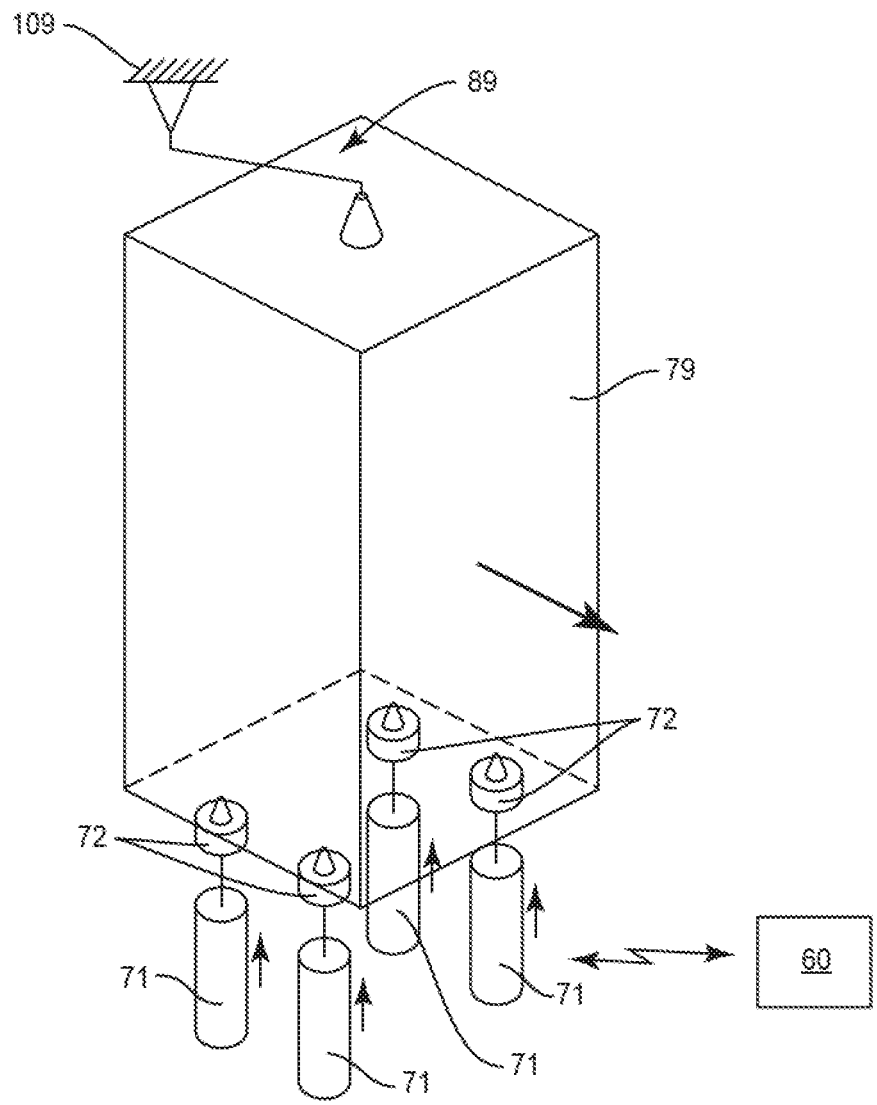
FIG. 6 is a schematic view of a test monument with a force being applied.

FIG. 6 illustrates a test monument 79 that is equipped for testing. The test monument 79 is equipped with pairs of extension members 71 and load cells 72. The number and position of the pairs of extension members 71 and load cells 72 corresponds to the attachment points 50. The compliance matrix is used during the testing to determine whether a test monument 79 that replicates the monument 30 is able to withstand a predetermined force that would be applied to the monument 30.

The extension members 71 are adjustable in length and are configured to replicate the displacement of the floor 20. In this regard, the flexibility of the floor 20 is substantially accounted for in the test by the vertical displacement of the extension members 71 simulating the flexed floor. This makes the test more accurate. The extension members 71 can include hydraulic cylinders that are adjustable in length, with various other mechanical components also being applicable for use. The load cells 72 are configured to detect a load at each attachment point. The load cells 72 can be transducers that convert force into a measurable electrical output.

The test monument 79 replicates the monument that is attached to the floor 20 of the aircraft 100. The test monument 79 can be the monument 30 itself that is to be attached to the floor 20. The test monument 79 can also be a blank member that is used during the testing to determine the result of the various applied forces. When the forces acting on the monument 30 are known, an accurate free-body diagram of the monument 30 can be made and the structural analysis of the monument 30 and its components becomes greatly simplified.

An upper attachment 89 attaches the test monument 79 to an upper support 109. The upper attachment 89 secures the test monument 79 and allows for a reduction of the floor reactions.

Figure 7:
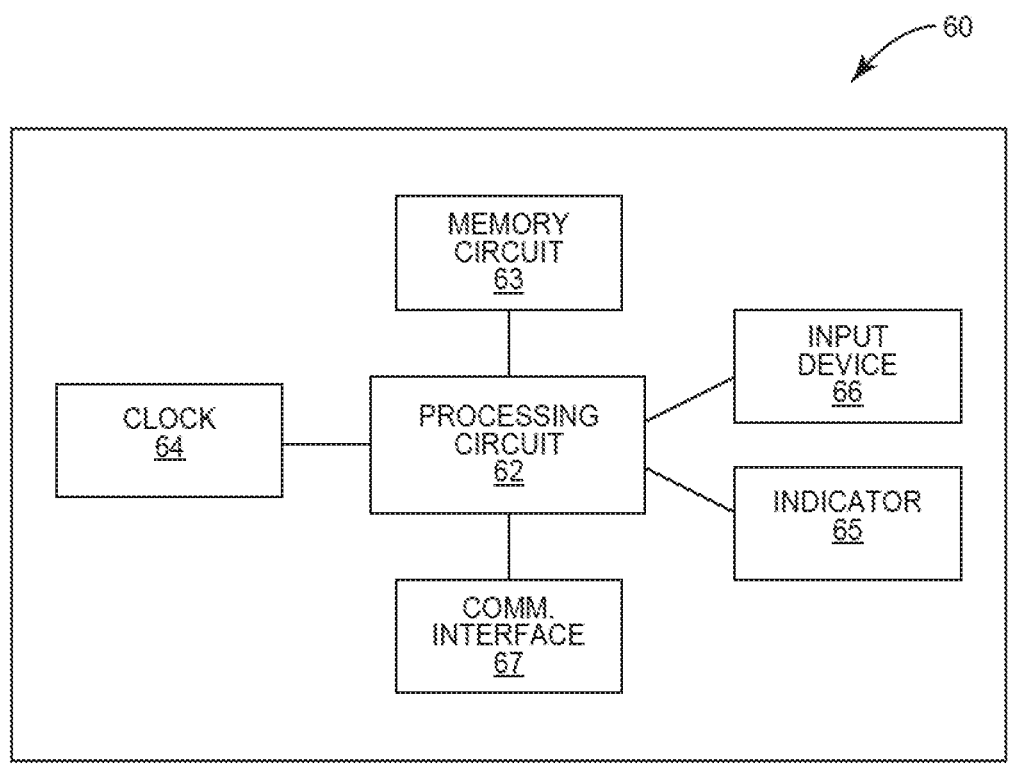
FIG. 7 is a schematic view of a control system for controlling testing of a monument.

A control system 60 can be operatively connected to the extension members 71 and load cells 72 during the testing. As illustrated in FIG. 7, the control system 60 includes a processing circuit 62 that can include one or more general-purpose and/or dedicated processors, including (but not limited to) one or more microprocessors, microcontrollers, application-specific integrated circuits (ASICs), field-programmable gate arrays (FPGAs), digital signal processors (DSPs), and/or other circuitry configured with appropriate software and/or firmware to control the testing procedure according to program instructions stored in a memory circuit 63. The memory circuit 63 stores processing logic, programming code, and operational information for use by the processing circuit 62. The memory circuit 63 can include volatile memory, non-volatile memory, or both, according to various embodiments.

A communications interface 67 provides for receiving and/or sending signals with the extension members 71 and load cells 72. The communications interface 67 can provide for wireless communications and can include an electronic transmitter and receiver. The communications interface 67 can additionally or alternatively be configured to support signaling over a wired connection, such as a serial, USB, micro USB, FIREWIRE, Lightning, and/or Thunderbolt connection.

A clock 64 is configured to measure various timing aspects of the testing. The control system 60 can further include one or more indicators 65, such as light-emitting diodes (LEDs) or LCD displays, for indicating various data items to an operator. An input device 66 such as a keypad, touchpad, switch, dial, buttons, track-ball, etc. can be included to receive inputs from an operator.

The use of the compliance matrix during testing accounts for the interdependency of the forces acting on the different attachment points 50. This provides a more accurate measurement of whether the test monument 79 is capable of sustaining the applied predetermined load and displacements that occur to the floor 20 at the attachment points 50.

As explained above, the compliance matrix is used during the testing to determine the displacement of the floor 20. In one testing method, a single party designs the floor 20, determines the attachment points 50, calculates the compliance matrix, and performs the testing. In another testing method, a first party designs the floor 20, determines the attachment points 50, and calculates the corresponding compliance matrix. The design of the floor 20 and/or the aircraft 100 can be proprietary and the first party may not want to disclose the full design to a second party. The first party can supply just the compliance matrix and attachment points 50 to the second party who can then perform the testing. It is not necessary for the first party to disclose the full design of the floor 20 and/or aircraft 100.

Figure 8:
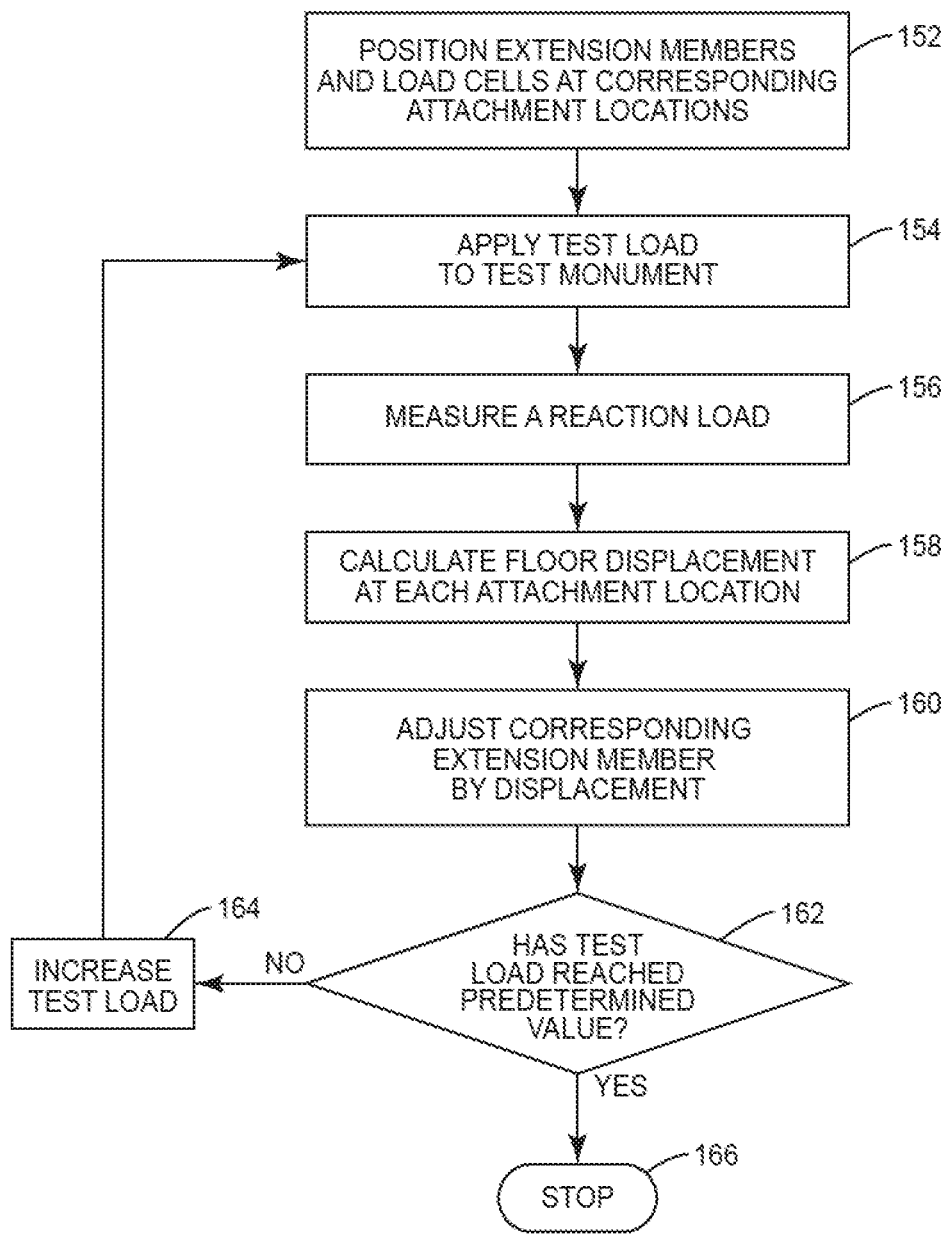
FIG. 8 is a flowchart of a method of testing a monument.

FIG. 8 illustrates a method of testing. A test monument 79 is equipped with an extension member 71 and load cell 72 pair at each corresponding attachment point 50 (block 152). A test load is then gradually applied to the test monument 79 (block 154). The test load can be applied to the test monument 79 away from the attachment points 50. One test method includes applying the test load at a center of gravity of the test monument 79. Depending upon the configuration of the test monument 79, the center of gravity can be located approximately half-way between a top and a bottom of the test monument. While the test load is gradually applied, a reaction load is measured at each of the load cells 72 (block 156).

Using the compliance matrix, a displacement of the floor 20 is calculated at each of the attachment points 50 (block 158). The matrix notation of the displacement is shown in equation 2:

$$\begin{bmatrix} \delta 1 \\ \delta 2 \\ \delta 3 \\ \delta 4 \end{bmatrix} = \begin{bmatrix} C11 & \ldots & C14 \\ \vdots & \ddots & \vdots \\ C41 & \ldots & C44 \end{bmatrix} \begin{bmatrix} R1 \\ R2 \\ R3 \\ R4 \end{bmatrix} \qquad \text{Eq. 2}$$

In this example, four attachment points 50 are used on the test monument 79 resulting in a 4×4 compliance matrix. Equation 3 includes the traditional mathematical notation of the matrix equation of Equation 2 in a compressed form:

$$\delta_i = C_{ij} R_j \qquad \text{Eq. 3}$$

After determining each of the displacements, each of the extension members 71 is then adjusted by the corresponding displacement (block 160). The frequency of the calculations and the displacement adjustments can vary. For example, the test load can be gradually applied to the test monument 79 over a test period that lasts tens of seconds. The frequency of the displacement calculations can occur several times over the test period. In one design, the frequency of the calculations is determined several times per second during a test that extends for tens of seconds.

When the test load that is applied to the test monument 79 has reached a predetermined value (block 162), the test is concluded (block 166). The test can conclude immediately after the test load has reached the predetermined value, or after the test load has been applied at the predetermined value for a predetermined period of time. If the test load has not reached the predetermine value (block 162), the test load is increased (block 164) and the process continues.

In some testing, the test load is gradually applied to the test monument 79. When the test load has not reached a predetermined value, the test load can be increased (block 164) and applied to the test monument 79 (block 154). The reaction load and floor displacements are calculated again at the designated frequency and the extension members 71 are adjusted accordingly. This process can continue until the test load has reached its predetermined value.

At the end of the test period, the structural integrity of the test monument 79 can be analyzed. The structural integrity can be analyzed to determine whether the test monument 79 can withstand the combined action of both the test load and the displacements at the attachment points 50. This can include no damage to the attachment points 50, no parts of the test monument breaking loose from the rest of the monument structure, and the ability of the test monument 79 to support an applied load for a period of time (e.g., three seconds). Damage or complete disintegration of the test monument 79 during the test process would manifest a test failure. The testing would stop at this time and no additional adjustments would be made to the test monument 79.

The use of the compliance matrix accounts for local floor deformations at the attachment points 50. The testing can also account for wider deformations (i.e., global deformations) of the floor 20 due to other aspects such as wing deformations. The total deformations can be calculated as a sum of displacement of the floor 20 due to local deformations and displacement of the floor 20 due to global deformations.

Figure 9:
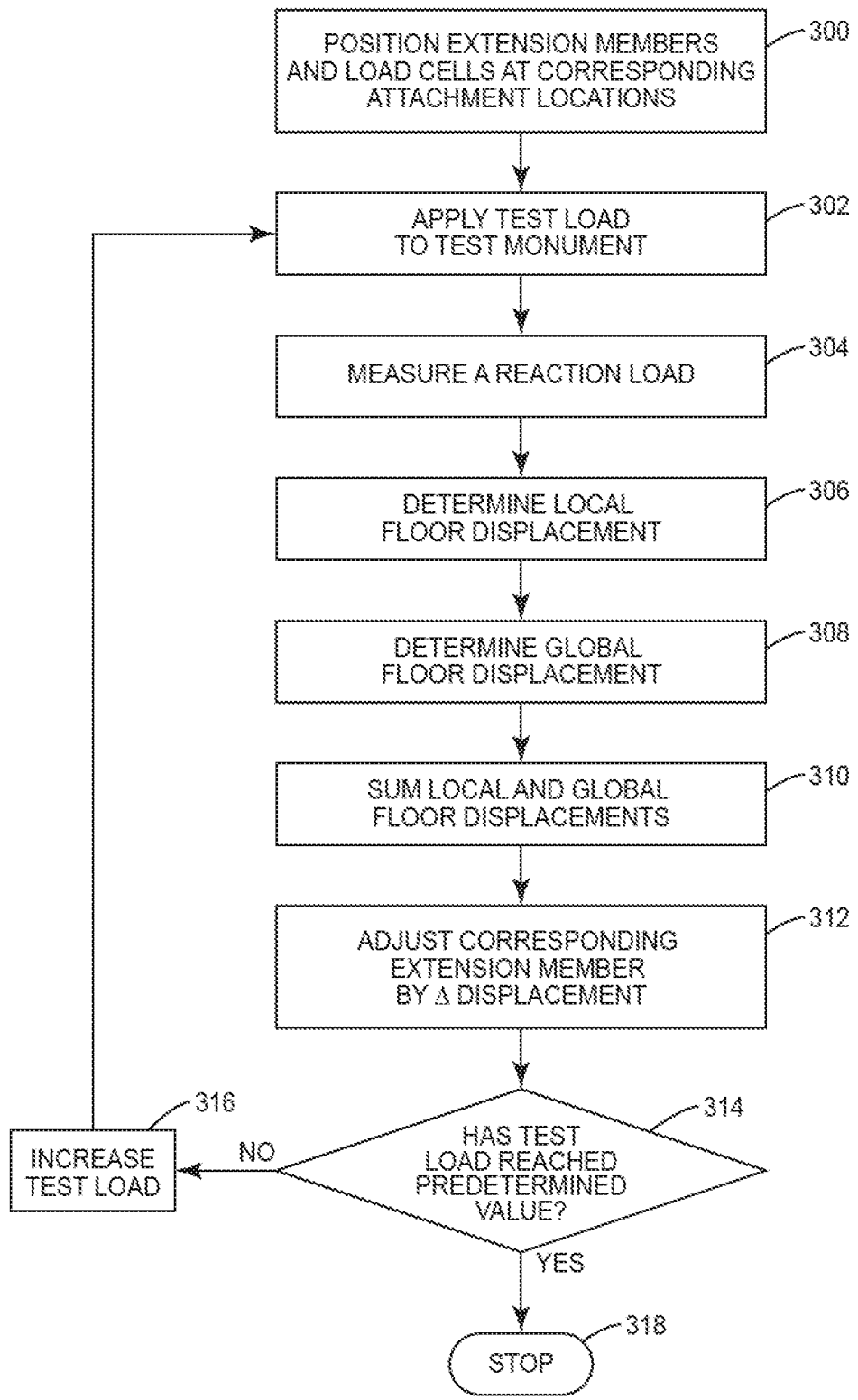
FIG. 9 is a flowchart of a method of testing a monument.

FIG. 9 includes a testing method that accounts for both local and global deformations that result in floor displacements. The testing includes just vertical displacements of the test monument 79 at the attachment points 50.

The method includes positioning pairs of extension members 71 and load cells 72 on the test monument 79 at the corresponding attachment points 50 (block 300). A test load is then applied to the test monument 79 (block 302) and a reaction load is measured at each load cell 72 (block 304). The compliance matrix is used to determine the floor displacement due to the local deformations (block 306).

A displacement is also determined for each attachment point 50 due to global deformation (block 308). This displacement can be predetermined and stored in the memory circuit 63 of the control system 60.

The total displacement at each attachment point 50 is determined by summing the local and global floor displacements (block 310). This can include summing each of the full displacements. This can also include summing a fraction of one or both of the local and global displacements. One methodology includes summing the full local displacement calculated using the compliance matrix, and a fraction of the global displacement based on a percentage of the test load applied to the test monument 79.

Once the displacement for each attachment point 50 is determined, the corresponding extension member 71 is adjusted accordingly (block 312). When the test load has reached the predetermined value (block 314), the test is concluded (block 318). If the test load has not reached the predetermined value (block 314), the test load is increased (block 316) and the testing continues.

Figure 10:
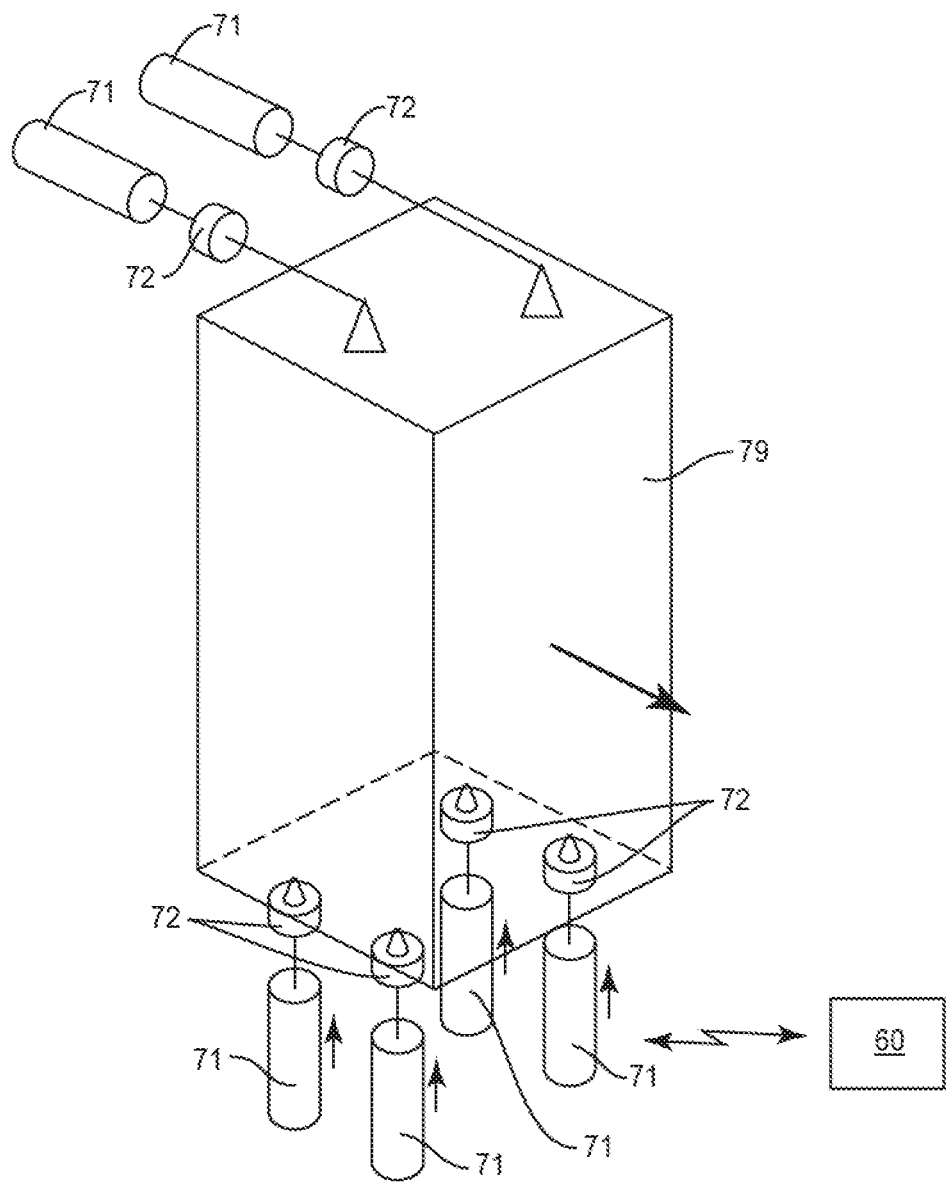
FIG. 10 is a schematic view of a test monument with a force being applied.

In one design, global deformation can be applied to the test monument 79 through the upper attachment 89. FIG. 10 illustrates a design in which one or more extension members 71 and corresponding load cells 72 are attached to the test monument 79. The upper extension members 71 can deform the test monument 79 to represent the global deformations.

During the testing, the vertical displacements of the lower attachment points 50 apply the various vertical displacements as described above. In addition, the upper extension member 71 can apply a predetermined displacement to the test monument 79. This displacement represents the global deformation experienced by the monument 70. The amount of displacement is provided by the aircraft manufacturer along with the compliance matrix. The amount of displacement applied by the upper extension member 71 can vary over the course of the testing to corresponding to the global displacements.

FIG. 10 illustrates multiple extension members 71 and load cells 72 attached to the upper side of the test monument 79. Other designs can include a single extension member 71/load cell 72 and also various different numbers of pairs of extension members 71 and load cells 72 attached to one or more sides of the test monument 79.

The devices and methods can be applied to aircraft 100. One aircraft 100 includes a commercial aircraft that includes rows of seats each configured to accommodate a passenger as illustrated in FIGS. 1, 2, and 3. Other aircraft 100 include but are not limited to manned aircraft, unmanned aircraft, manned spacecraft, unmanned spacecraft, manned rotorcraft, unmanned rotorcraft, satellites, rockets, missiles, manned terrestrial aircraft, unmanned terrestrial aircraft, manned surface water borne aircraft, unmanned surface water borne aircraft, manned sub-surface water borne aircraft, unmanned sub-surface water borne aircraft, and combinations thereof.

The present invention can be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of testing a monument that is to be attached to a floor of an aircraft, the method comprising:
   receiving a compliance matrix of the floor of the aircraft and attachment points where a monument is to be attached to the floor of the aircraft;
   placing an extension member and a load cell on a test monument at attachment locations corresponding to the attachment points;
   during a test period, gradually applying a test load to the test monument;
   at a designated testing frequency during the test period and prior to reaching a predetermined test load:
      measuring with the load cells a reaction load at each of the attachment locations on the test monument;
      calculating a displacement of the floor at each of the attachment locations using the compliance matrix; and
      adjusting each of the extension members by the corresponding displacement.

2. The method of claim 1, further comprising determining whether the reaction loads at the attachment locations exceed a predetermined amount during the test period.

3. The method of claim 1, wherein placing the extension members and the load cells on the test monument at the attachment locations corresponding to the attachment points comprises placing hydraulic cylinders and the load cells on the test monument at the attachment locations corresponding to the attachment points.

4. The method of claim 1, wherein placing the extension members and the load cells on the test monument at the attachment locations corresponding to the attachment points comprises attaching one of the extension members and one of the load cells on the test monument at each of the attachment locations.

5. The method of claim 1, wherein each of the attachment points includes one of the extension members and load cells.

6. The method of claim 1, wherein calculating the displacement of the floor at each of the attachment locations using the compliance matrix comprises determining the displacement of the floor based on an interdependency between the displacements at each of the attachment locations.

7. The method of claim 1, further comprising at the designated testing frequency during the test period and prior to reaching the predetermined test load, adjusting each of the extension members by an additional amount based on a global floor displacement.

8. The method of claim 1, wherein the monument is either a galley or a lavatory that are each configured to be attached to the floor of the aircraft.

9. A method of testing a monument that is to be attached to a support structure, the method comprising:
   receiving a compliance matrix of a structure and attachment points where a monument is to be attached to the structure, with the structure being larger than the monument;
   placing a hydraulic cylinder and a load cell on a test monument at attachment locations corresponding to the attachment points;
   applying a test load to the test monument during a test period;
   at a designated testing frequency during a test period:
      increasing the test load that is applied to the test monument;
      measuring with the load cells a reaction load at each of the attachment locations on the test monument;
      calculating a displacement of the structure at each of the attachment locations using the compliance matrix; and
      adjusting each of the hydraulic cylinders by the corresponding displacement.

10. The method of claim 9, further comprising determining whether the reaction loads at the attachment locations exceed a predetermined amount during the test period.

11. The method of claim 9, wherein each of the attachment points includes one of the extension members and load cells.

12. The method of claim 9, further comprising the compliance matrix having rows and columns, with each of the rows and columns being equal to a number of the attachment points.

13. The method of claim 9, wherein the test monument is one of a galley or a lavatory and the structure is a floor of an aircraft.

14. The method of claim 9, wherein calculating the displacement of the structure at each of the locations using the compliance matrix comprises calculating the displacement based on an interdependency between the displacements at each of the attachment locations.

15. The method of claim 9, further comprising at the designated testing frequency during the testing period and prior to reaching a predetermined test load, adjusting each of the hydraulic cylinders by an additional amount based on a global floor displacement.

16. A computing device configured to calculate reaction loads exerted on a test monument during testing, the computing device comprising:
   a communications interface circuitry configured to receive a compliance matrix of a floor of an aircraft and attachment points where a test monument is to be attached to the floor of the aircraft;
   processing circuitry configured to:
      receive signals indicating a reaction load at attachment locations on the test monument that correspond to the attachment points;
      calculate a displacement of the floor at each of the attachment locations using the compliance matrix and measured reaction loads at each of the locations; and adjust extension members at each of the attachment locations by the corresponding displacement.

17. The computing device of claim 16, wherein the processing circuitry is further configured to determine whether the reaction loads at the attachment locations exceed a predetermined amount.

18. The computing device of claim 16, wherein the signals are received from load cells that are attached to the test monument at attachment locations on the test monument.

19. The computing device of claim 16, wherein the signals are received while a test load is applied to the test monument.

20. The computing device of claim 16, wherein the processing circuitry is further configured to adjust each of the extension members by a global floor displacement.

* * * * *